June 22, 1926.
H. PAYTON
CHAIN STRUCTURE
Filed Sept. 8, 1924
1,589,423
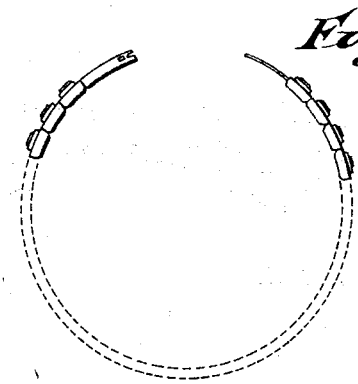
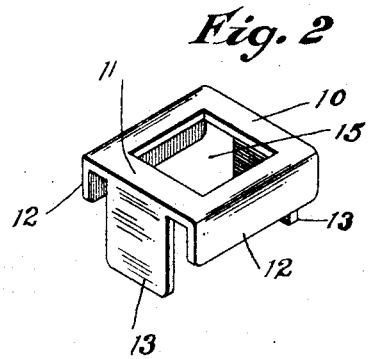
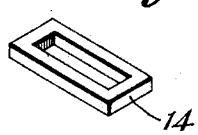
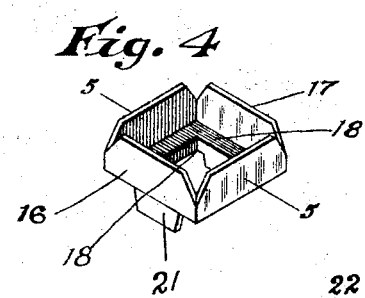
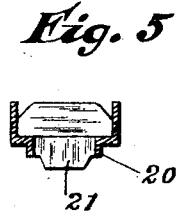
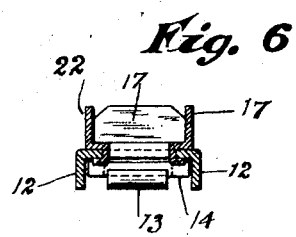
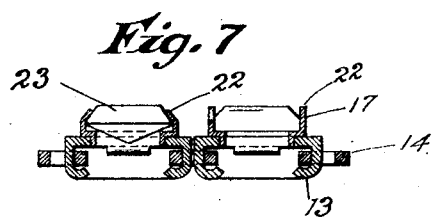
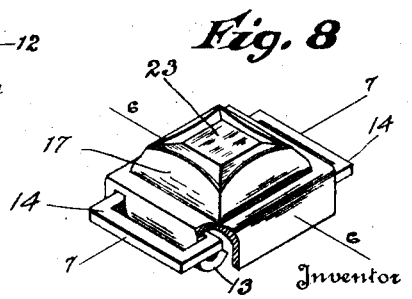
Inventor
Harry Payton.
By Barlow & Barlow
Attorneys Patented June 22, 1926.

1,589,423

UNITED STATES PATENT OFFICE.

HARRY PAYTON, OF PROVIDENCE, RHODE ISLAND.

CHAIN STRUCTURE.

Application filed September 8, 1924. Serial No. 736,471.

This invention relates to an improved construction of gem-set chain or bracelet; and has for its object to provide a chain or bracelet of this character formed of a series of flexibly connected gem-set links, each link comprising a body member and gem-setting member connected to the body member.

With these and other objects in view, the invention consists of certain novel features of construction, as will be more fully described, and particularly pointed out in the appended claim.

In the accompanying drawings;

Figure 1 is a side elevation showing a portion of a bracelet of my improved construction.

Figure 2 is an enlarged perspective view of the body of a gem-setting link.

Figure 3 is a connector link which is employed for flexibly joining the adjacent body members of the links together.

Figure 4 is a perspective view of the gem-setting member of the link, detached.

Figure 5 is a sectional elevation on line 5—5 of Figure 4.

Figure 6 is a sectional elevation on line 6—6 of Figure 8, showing the setting member as mounted on the body member.

Figure 7 is a sectional view showing a plurality of gem-set links of my improved construction flexibly connected together.

Figure 8 is a perspective view of one of my improved gem-setting links broken away to show the connector lip of one of the body members as extending through the connector link.

It is found in the practical construction and operation of bracelets or chains of this character, of advantage to form the gem-setting member separately from the body member, the setting member having prongs or portions adapted to extend into an opening in the body member to connect these two members together also to provide on the body member a lip or finger which extends through a connector link member to flexibly join the setting links together; and the following is a detailed description of one means by which these advantageous results may be accomplished:—

With reference to the drawings, 10 designates the body member of the setting link which is formed of sheet stock having a top plate 11 with its opposite side walls 12 bent downwardly and at substantially right angles thereto, and its end walls elongated to provide connecting fingers 13 which are adapted to extend through the connecting link 14 to flexibly join adjacent gem-setting links together.

This top plate 11 of the body member is preferably cut away to provide an opening 15 therein to permit light to pass through the gems to render them more brilliant.

In order to provide simple and practical setting members for the gem, I have formed a box-shaped member 16 which is drawn up or folded from sheet stock into substantially box form having upstanding bendable side walls 17, the center portion of the bottom wall 18 of this setting member being preferably also removed or punched out forming an opening 19 therethrough to also permit the light from the under side to act upon the gem, the stock about this opening providing a centralizing flange 20 as it extends down into the opening 15 in the top plate of the body member. The side walls of this centralizing flange 20 are also provided with elongated portions 21 which are adapted to be bent back or outwardly underneath the top plate 11 of the body member to securely lock or connect the setting member to the body member without the use of solder.

The edges 22 of the walls 17 of this setting member are adapted to be bent inwardly over the edges of the gem 23 for securely mounting the gem therein. Thus this gem-setting link with a gem mounted therein is formed complete all without the use of solder.

My complete bracelet is very strong and durable in construction and is handsome and attractive in appearance.

The foregoing description is directed solely towards the construction illustrated, but I desire it to be understood that I reserve the privilege of resorting to all the mechanical changes to which the device is susceptible, the invention being defined and limited only by the terms of the appended claim.

I claim:

A chain structure formed of a series of gem-setting links hingedly connected together, said links comprising a body member having a top plate with an opening therein, and a separate rectangular cup-shaped gem-setting member having a bottom wall forming a seat for the gem mounted to rest upon said plate with its side walls cut away at its upper corners providing bendable edge portions to be folded over the gem, a portion of the bottom wall of said cup-shaped member being turned outwardly providing bendable portions entering and engaging the walls of said opening to connect said members together.

In testimony whereof I affix my signature.

HARRY PAYTON.